United States Patent [19]
Cho

[11] Patent Number: 6,115,619
[45] Date of Patent: Sep. 5, 2000

[54] DEVICE AND METHOD FOR CONTROLLING DISPLAY TO PROVIDE NOISE SUPPRESSION IN RADIO COMMUNICATION SYSTEM

[75] Inventor: Sung-Min Cho, Kyongsangbuk-do, Rep. of Korea

[73] Assignee: Samsung Electronics Co., Ltd., Rep. of Korea

[21] Appl. No.: 09/143,019

[22] Filed: Aug. 28, 1998

[51] Int. Cl.$^7$ ..................................................... H04B 1/38
[52] U.S. Cl. ..................... 455/566; 455/159.1; 455/310; 345/46
[58] Field of Search ................... 455/566, 154.1, 455/129.2, 296, 298, 310, 157.2, 159.1, 159.2; 345/104, 179, 174, 33, 34, 46, 53, 54

[56] References Cited

U.S. PATENT DOCUMENTS

| | | | |
|---|---|---|---|
| 3,882,399 | 5/1975 | Karpowycz et al. | 455/157.2 |
| 4,896,370 | 1/1990 | Kasparian et al. | 455/566 |
| 5,155,759 | 10/1992 | Saegusa et al. | 455/566 |
| 5,471,255 | 11/1995 | Hagerman | 345/53 |
| 5,517,551 | 5/1996 | Arai | 455/566 |
| 5,936,599 | 8/1999 | Reymond | 345/46 |

FOREIGN PATENT DOCUMENTS

| | | | |
|---|---|---|---|
| 3228203 | 2/1984 | Germany | 455/159.1 |
| 0123308 | 7/1984 | Japan | 455/157.2 |
| 0171212 | 9/1984 | Japan | 455/157.1 |

*Primary Examiner*—Edward F. Urban
*Assistant Examiner*—Tilahun Gesesse
*Attorney, Agent, or Firm*—Dilworth & Barrese

[57] ABSTRACT

A method and device for controlling a display to suppress noise generated from displaying elements of the display in a radio communication system. In one aspect, a display control device for suppressing noise in a radio communication system comprises: a display having N displaying elements, the N displaying elements being paired, each of the pairs having a first displaying element and a second displaying element; and a controller, operatively connected to the display, for outputting a first control voltage having a first phase to control each of the first displaying elements of the pairs, and for outputting a second control voltage having a second phase to control each of the second displaying elements of the pairs, the first phase and the second phase having a phase relationship which provides for a reduction of resultant noise generated by the N displaying elements.

4 Claims, 6 Drawing Sheets

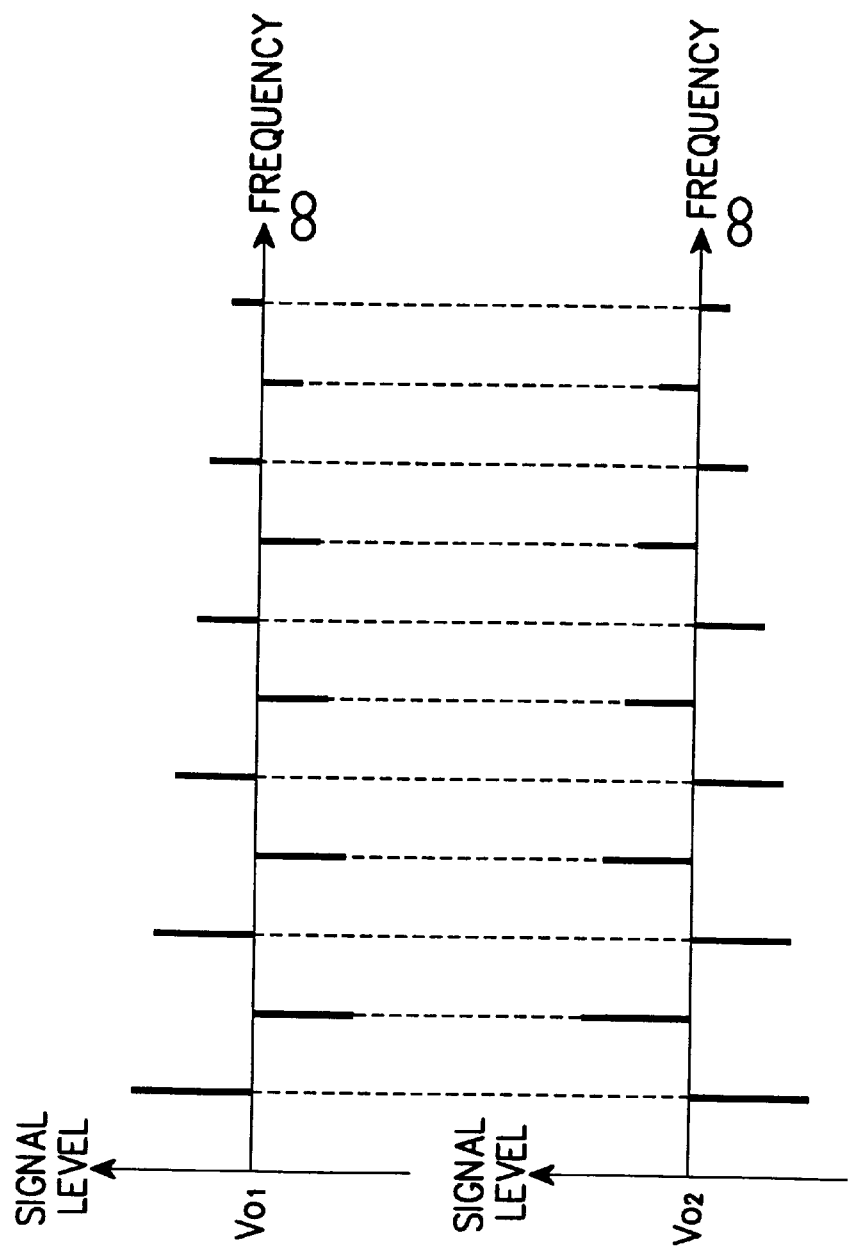

DEVICE AND METHOD FOR CONTROLLING DISPLAY TO PROVIDE NOISE SUPPRESSION IN RADIO COMMUNICATION SYSTEM

BACKGROUND

1. Technical Field

The present application relates generally to a radio communication system and, in particular, to a device and method for controlling a display to suppress noise generated from the display in a radio communication system.

2. Description of the Related Art

In general, a radio communication system includes a display consisting of a multiplicity of displaying elements to display the operating status thereof. Typically, the display comprises either a plurality of LEDs (Light Emitting Diodes) or seven-segment displays, which are turned on and off at specified intervals to indicate an operating status of the radio communication system. In particular, the display typically includes separate displaying elements for indicating a normal operating status and for indicating an abnormal operating status. These displaying elements operate by flickering at stated periods so as to indicate either the normal or abnormal operating status.

Referring now to FIG. 1, a diagram illustrates a display control device of a radio communication system. The display control device includes a microprocessor 10, a first displaying element LED1 and a second displaying element LED2. For the convenience of explanation, it is assumed that LED1 and LED2 of FIG. 1 are utilized for indicating a normal operating status of the system. For example, the first displaying element LED1 can be used for indicating a normal operating status of one part of a radio communication system and the second displaying element LED2 can be used for indicating a normal operating status of another part of the system. As illustrated, LED1 comprises an anode which is connected to a supply voltage Vcc via a resistor R1, and a cathode which is connected to a collector of a first NPN transistor Q1 (which operates as a switching element). The first transistor Q1 includes an emitter which is connected to ground and a base which is connected to the microprocessor 10 via a current limiting resistor R3. A first control voltage Vo1 is generated by the microprocessor 10 and applied to the base of transistor Q1.

Similarly, LED2 comprises an anode which is connected to the supply voltage Vcc via a resistor R2, and a cathode which is connected to a collector of a second NPN transistor Q2 (which also operates as a switching element). The second transistor Q2 has an emitter which is connected to ground and a base which is connected to the microprocessor 10 via a current limiting resistor R4. A second control voltage Vo2 is generated by the microprocessor 10 and applied to the base of transistor Q2. The microprocessor 10 controls the first and second transistors Q1 and Q2 via the first control voltage Vo1 and second control voltage Vo2, respectively, so as to activate and deactivate (i.e., turn on and off) LED1 and LED2.

When the system operates normally, LED1 and LED2 will flicker on and off in accordance with the respective control voltage waveforms illustrated in FIGS. 2A and 2B to indicate a normal operating status. In particular, the microprocessor 10 outputs the first control voltage Vo1 (shown in FIG. 2A) and the second control voltage Vo2 (shown in FIG. 2B) in rectangular waveforms. When the respective parts of system corresponding to LED1 and LED2 operate normally, LED1 and LED2 are simultaneously activated and deactivated at the same time periods (in accordance with the waveforms of FIGS. 2A and 2B, respectively). Consequently, LED1 and LED2 will generate noise frequencies as shown in FIGS. 3A and 3B, respectively.

Specifically, FIG. 3A illustrates noise frequencies that are generated when LED1 is activated and deactivated in accordance with the first control voltage Vo1 of FIG. 2A. Similarly, FIG. 3B illustrates noise frequencies that are generated when LED2 is activated and deactivated in accordance with the second control voltage Vo2 of FIG. 2B. Theoretically, the noise frequencies generated from LED1 and LED2 have infinite harmonics. In addition, since the frequencies generated by the activation/deactivation of LED1 and LED2 are in phase, the noise frequencies will constructively interfere with each other, thereby amplifying the noise signals of the respective frequency components.

The problem with these resultant noise frequencies is that they have an influence upon the communication quality of a radio communication system such as a TDMA (Time Division Multiple Access) communication system and, especially, a DECT (Digital European Cordless Telephone) system. In addition, notwithstanding that the noise frequencies generated from the respective LEDs may have a slight phase difference, some harmonics may have the same frequencies. Consequently, similar frequency components will constructively interfere with each other, thereby amplifying the noise signals having similar frequencies. Unfortunately, these noise signals can deteriorate the communication quality of the radio communication system.

SUMMARY OF THE INVENTION

The present application is directed to a method and device for controlling a display to suppress noise generated from displaying elements of the display in a radio communication system.

In one aspect, a display control device for suppressing noise in a radio communication system comprises: a display having N displaying elements, the N displaying elements being paired, each of the pairs having a first displaying element and a second displaying element; and a controller, operatively connected to the display, for outputting a first control voltage having a first phase to control each of the first displaying elements of the pairs, and for outputting a second control voltage having a second phase to control each of the second displaying elements of the pairs, the first phase and the second phase having a phase relationship which provides for a reduction of resultant noise generated by the N displaying elements.

These and other features and advantages of the present invention will become apparent from the following detailed description of illustrative embodiments, which is to be read in connection with the accompanying drawings.

BRIEF DESCRIPTION OF THE DRAWINGS

FIGS. 5A and 5B are diagrams of frequencies generated from displaying elements of a display in accordance with the control voltages of FIGS. 4A and 4B.

DETAILED DESCRIPTION OF PREFERRED EMBODIMENTS

Figure 1:
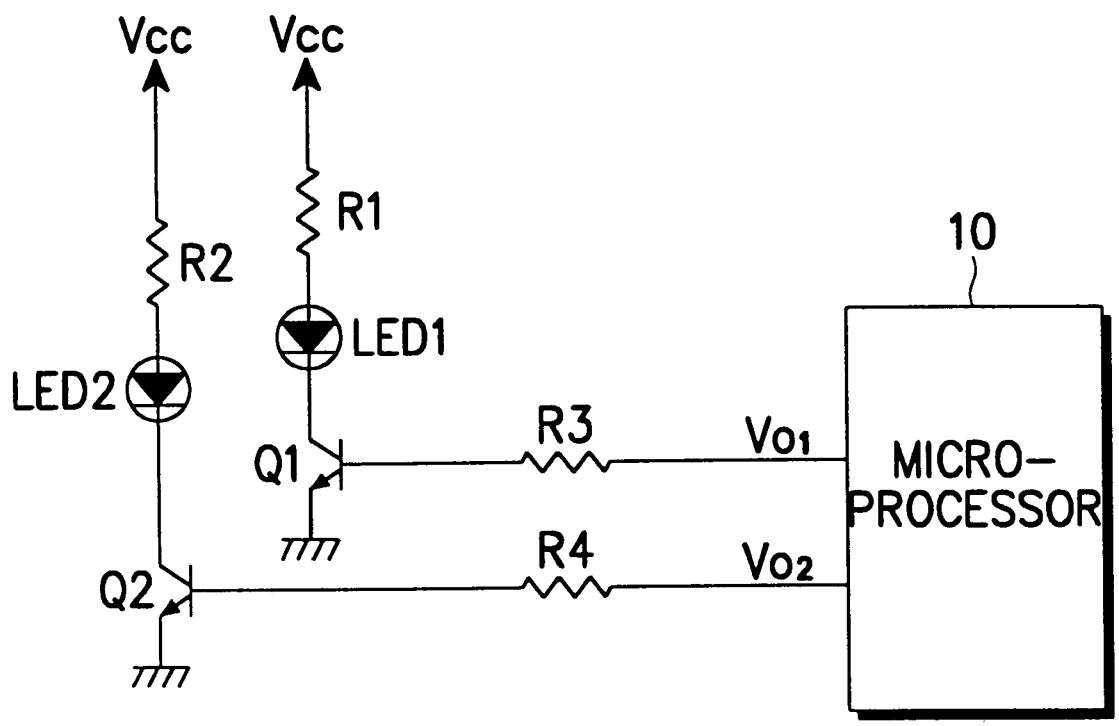
FIG. 1 is a diagram of a conventional display control device for a radio communication system.
Figures 2A, 2B:
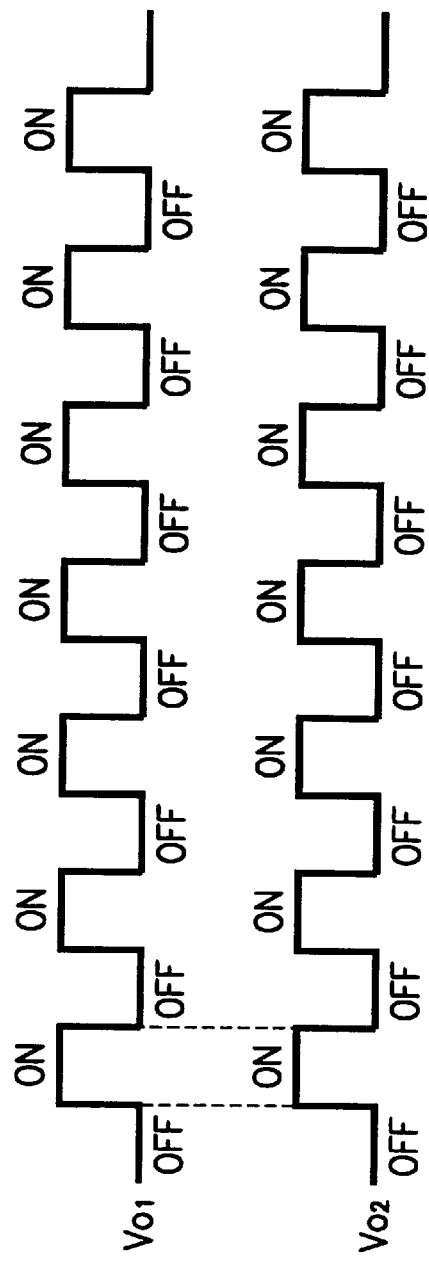
FIGS. 2A and 2B are diagrams of control voltage waveforms generated by the display control device of FIG. 1.
Figures 3A, 3B:
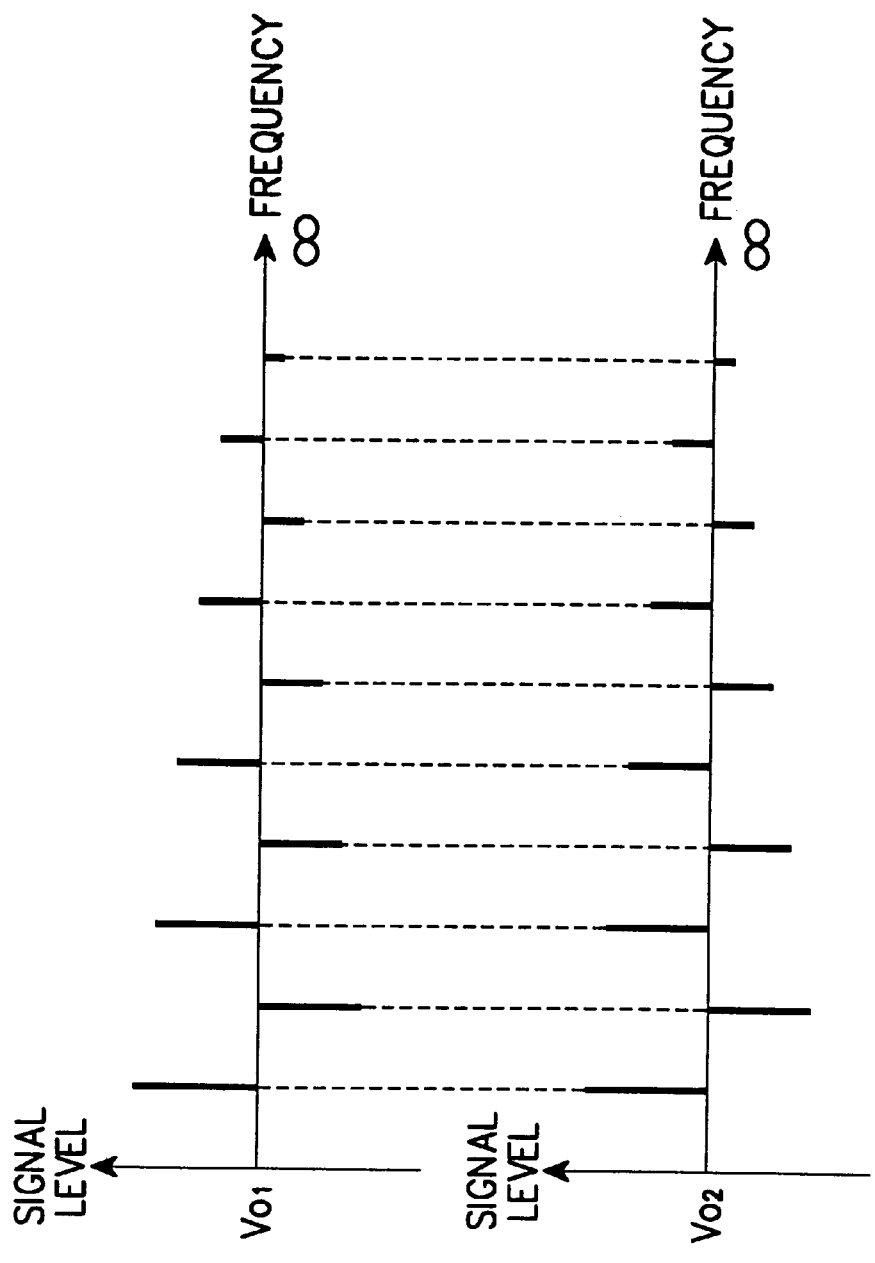
FIGS. 3A and 3B are diagrams of frequencies which are generated by LEDs of the display control device of FIG. 1 in accordance with the control voltages of FIGS. 2A and 2B.

A method for controlling a display to suppress noise in a radio communication system will now be discussed with reference to FIGS. 1, 4A and 4B. The microprocessor 10 of FIG. 1 generates a first control voltage Vo1 having a specified cycle shown in FIG. 4A to operate LED1. When the first control voltage Vo1 is at a high level, the first transistor Q1 is turned on, which causes current to flow from the supply voltage Vcc through the current limiting resistor R1 and LED1 to the collector of the first transistor Q1, thereby activating (i.e., turning on) LED1. On the other hand, when the first control voltage Vo1 output from the microprocessor 10 is at a low state, the first transistor Q1 is turned off, and no current is supplied to LED1 from the supply voltage Vcc. As a result, LED1 is deactivated (i.e., turned off). Similarly, the second control voltage Vo2 output from the microprocessor 10 controls the switching operation of the second transistor Q2 to turn on/off LED2 in the manner discussed above for LED1.

Figures 4A, 4B:
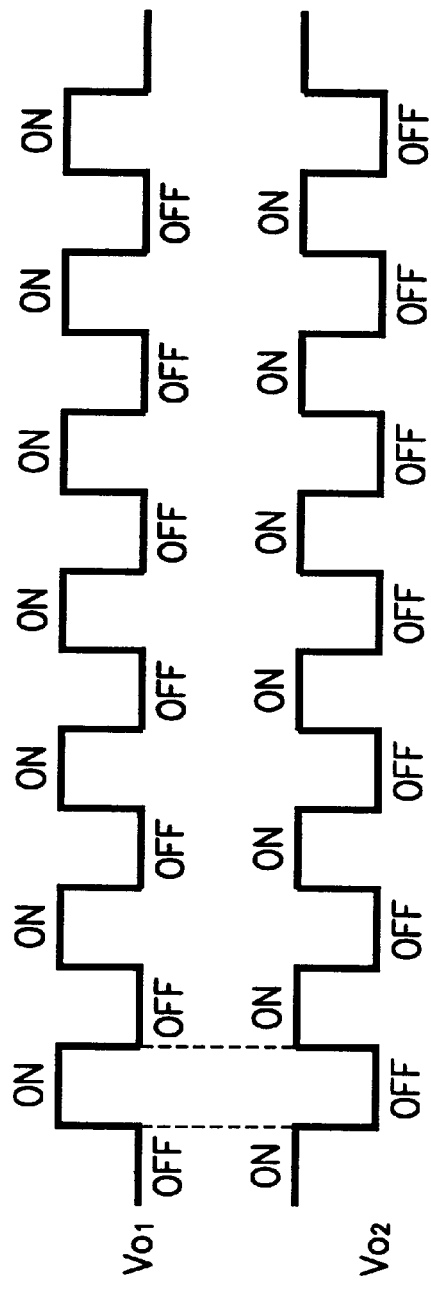
FIGS. 4A and 4B are diagrams of control voltage waveforms for controlling a display in accordance with one aspect of the present invention.

As shown in FIGS. 4A and 4B, the waveform of the first control voltage Vo1 is shifted 180° in phase (or by ½ cycle) from the waveform of the second control voltage Vo2. Therefore, LED1 and LED2 are alternately activated and deactivated with respect to each other.

Referring now to FIGS. 5A and 5B, the respective frequencies generated by the alternate activation/deactivation of LED1 (in response to the first control voltage Vo1 of FIG. 4A) and LED2 (in response to the second control voltage Vo2 of FIG. 4B) are shown. As illustrated, the frequencies generated from LED1 and LED2 have opposite phases. Consequently, the noise frequencies generated by LED1 and LED2 cancel each other out.

Figure 6:
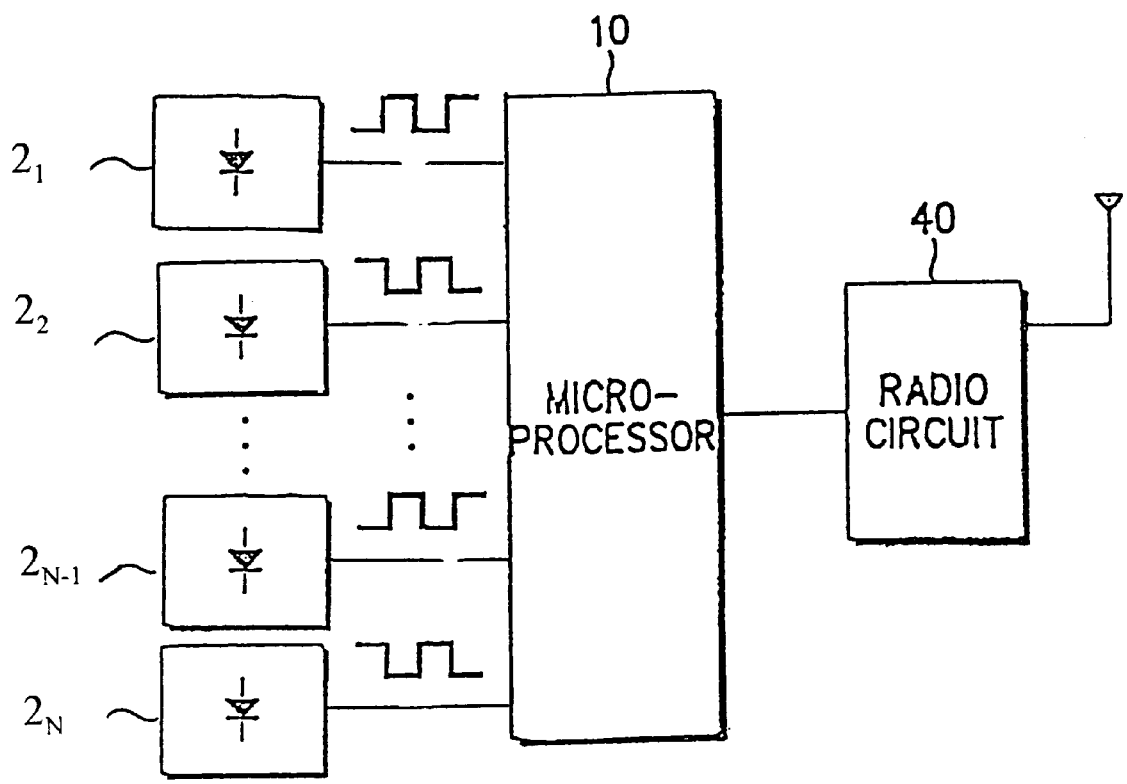
FIG. 6 is a schematic diagram of a display control device for a radio communication system in accordance with one aspect of the present invention.

Referring now to FIG. 6, a diagram illustrates a display control device for suppressing noise in a radio communication system in accordance with one aspect of the present invention. A radio circuit 40 transmits/receives a radio signal under the control of the microprocessor 10. The microprocessor controls the overall operations of the radio communication system and, in particular, outputs the control voltages Vo1 and Vo2 shown in FIGS. 4A and 4B, respectively. In particular, the microprocessor 10 includes N output ports which output the control voltages. The device includes N displaying elements (denoted as $2_1$ through $2_N$), and each of the N displaying elements is connected to a corresponding one of the N output ports of the microprocessor 10. The N display elements are turned on/off in response to the control voltages supplied from the corresponding N output port of the microprocessor 10. The microprocessor 10 pairs the displaying elements $2_1$ through $2_N$, with each pair having a first and second displaying element. For example, as shown in FIG. 6, displaying element $2_1$ is paired with displaying element $2_2$, and displaying element $2_{N-1}$ is paired with displaying element $2_N$. The microprocessor 10 outputs the control voltage Vo1 (shown in FIG. 4A) to the first displaying element in each of the pairs and outputs the control voltage Vo2 (shown in FIG. 4B) to the second displaying element in each of the pairs. Consequently, as discussed above with reference to FIGS. 5A and 5B, the noise frequencies output from the respective pairs of the displaying elements (e.g., $2_1$, $2_2$ and $2_{N-1}$, $2_N$) can be canceled out. Advantageously, noise generated by the displaying elements of the display can be significantly reduced, thereby mitigating the interference on the communication quality of the radio communication system.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A display control device for suppressing noise in a radio communication system, comprising:

a display having N displaying elements, said N displaying elements being paired, each of said pairs having a first displaying element and a second displaying element; and a controller, operatively connected to said display, for outputting a first control voltage having a first phase to control each of said first displaying elements of said pairs, and for outputting a second control voltage having a second phase to control each of said second displaying elements of said pairs, said first phase and said second phase having a phase relationship which provides for a reduction of resultant noise generated by said N displaying elements.

2. The device of claim 1, wherein said first phase and said second phase are substantially 180 degrees apart.

3. A method for controlling a display to suppress noise in a radio communication system, said display having a plurality of displaying elements, said method comprising the steps of:

pairing each of said plurality of displaying elements, each pair having a first displaying element and a second displaying element;

outputting a first control voltage having a first phase for controlling each of said first displaying elements of said pairs; and outputting a second control voltage having a second phase for controlling each of said second displaying elements of said pairs, said first phase and said second phase having a phase relationship which provides for a reduction of resultant noise generated by said plurality of displaying elements.

4. The method of claim 3, wherein said first phase and said second phase are substantially 180 degrees apart.

* * * * *

UNITED STATES PATENT AND TRADEMARK OFFICE
CERTIFICATE OF CORRECTION

PATENT NO.    : 6,115,619
DATED         : September 5, 2000
INVENTOR(S)   : Sung-Min Cho Page 1 of 1

It is certified that error appears in the above-identified patent and that said Letters Patent is hereby corrected as shown below:

There is an error with respect to the Foreign Application Priority Data.
The information is missing and should read as follows:

--Aug. 30, 1997 [KR] Rep. of Korea......................97-43778--.

Signed and Sealed this

Twelfth Day of June, 2001

*Attest:*

NICHOLAS P. GODICI
*Attesting Officer*    *Acting Director of the United States Patent and Trademark Office*